United States Patent [19]

Shimamura

[11] Patent Number: 5,204,946
[45] Date of Patent: Apr. 20, 1993

[54] MIXED TEXT AND IMAGE DATA PROCESSING

[75] Inventor: Yasuhito Shimamura, Yokohama, Japan

[73] Assignee: Canon Kabushiki Kaisha, Tokyo, Japan

[21] Appl. No.: 831,745

[22] Filed: Feb. 10, 1992

Related U.S. Application Data

[63] Continuation of Ser. No. 365,718, Jun. 14, 1989, abandoned.

[30] Foreign Application Priority Data

Jun. 17, 1988 [JP] Japan ............................. 63-148315

[51] Int. Cl.⁵ ............................................. G06F 15/20
[52] U.S. Cl. ..................................... 395/146; 395/147
[58] Field of Search ........................... 395/144–148; 364/419

[56] References Cited

U.S. PATENT DOCUMENTS

| | | | |
|---|---|---|---|
| 4,587,633 | 5/1986 | Wang et al. | 364/521 |
| 4,589,144 | 5/1986 | Namba | 364/518 |
| 4,723,210 | 2/1988 | Barker et al. | 364/300 |
| 4,723,211 | 2/1988 | Barker et al. | 364/300 |

*Primary Examiner*—Heather R. Herndon
*Attorney, Agent, or Firm*—Fitzpatrick, Cella, Harper & Scinto

[57] ABSTRACT

An image received is inserted at appropriate positions of a text which is separately received through a communication line. More specifically, a text is displayed first, and an arbitrary area in the displaying screen is then set. Thereafter, the text being displayed is rearranged outside the area which has been set, and an image which is separately received is then spread within the area set.

26 Claims, 10 Drawing Sheets

MIXED TEXT AND IMAGE DATA PROCESSING

This application is a continuation of application Ser. No. 07/365,718 filed June 14, 1989, now abandoned.

BACKGROUND OF THE INVENTION

1. Field of the Invention

The present invention relates to a data processing apparatus of the type which is capable of receiving text data constituted by character codes and image data through a communication line.

2. Description of the Related Art

Recently, there has been an increasing demand for multi-function communication terminals capable of performing communications in various types of communication modes. In particular, there has been a demand for an apparatus with both a teletex communication function and a facsimile communication function in which these data of different characteristics can be integrally processed. Apparatuses having both a teletex communication function and a facsimile communication function include so-called mixed-mode facsimile machine. However, no mixed-mode facsimile machine which is capable of integrally processing communication data having different characteristics has yet been proposed.

For example, it is conceivable that a file could be created by spreading (allocating or positioning at one or more places) image data received by facsimile in appropriate positions within a text received. At present, since such apparatus do not have flexible text editing functions, the image data must be inserted as separate pages when the pages of text are edited. In other words, the pages on which the image data are to be spread are created first, and these pages of image data are then inserted at appropriate positions between the pages of text.

SUMMARY OF THE INVENTION

In view of the aforementioned shortcomings of the related art, an object of the present invention is to provide a data processing apparatus which is capable of spreading image data in text data received.

To achieve the above-described object, the present invention provides, in one aspect, a data processing apparatus which comprises a receiving means for receiving text data and image data through a communication line; a display means for displaying the text data received by the receiving means; a setting means for setting a desired area in the text data displayed by the display means; an arranging means for rearranging the characters that constitute the text displayed in an area exclusive of the area which has been set; and a spreading means for spreading the image data received by the receiving means in the area which has been set by the setting means.

Other objects, features and advantages of the present invention will be apparent from the following description taken in conjunction with the accompanying drawings in which like reference characters designate the same or similar parts throughout the figures thereof.

DESCRIPTION OF THE PREFERRED EMBODIMENT

An embodiment of the present invention will now be described with reference to the accompanying drawings.

Figure 1:
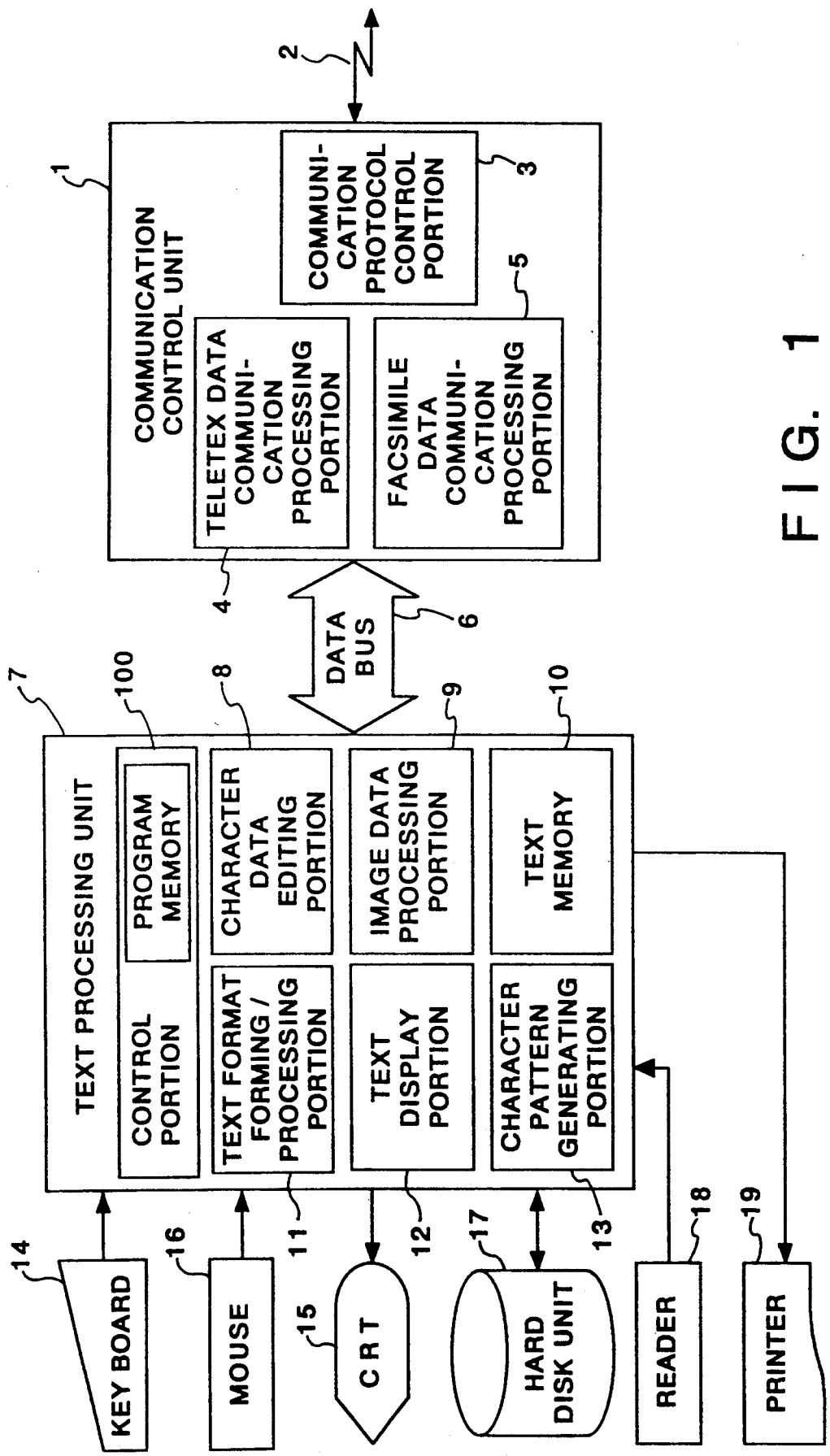
FIG. 1 is a schematic view of a text/image processing apparatus, illustrating the preferred embodiment of the present invention.

FIG. 1 is a schematic view of a text/image processing apparatus of the present invention.

A communication control unit 1 of this text/image processing apparatus includes a communication protocol control portion 3 for controlling the protocol required for receiving data from a communication line 2, a teletex data communication processing portion 4 for processing the communication of teletex data, and a facsimile data communication processing portion 5 capable of mixed-mode communication.

Documents or images which are input to the document/image processing apparatus through the communication control unit 1 are processed by a text processing unit 7, which includes the following components.

A control portion 100 of the text processing unit 7 controls the entire apparatus, including the communication control unit 1 and the text processing unit 7, in accordance with the programs stored in a program memory. This program memory stores a program required for a data reception process which is performed through the communication line 2, those for various types of editions, and those related to the flowcharts shown in FIG. 5. Text data, e.g., a set of character code data, received by the communication control unit 1 is edited by a character data editing portion 8, and image data, e.g., image data received by the facsimile facility, is processed in various ways by an image data processing portion 9. The processes performed by this image data processing portion 9 include enlargement/reduction of the size of data, movement of data and so on. A text memory 10 is used for such processes. A text format forming/processing portion 11 determines the format of a text which is required when a new text is created by combining texts received by a teletex facility and images received by a facsimile facility, e.g., it determines the character size expressed point, and processes the format of text on the basis of the results of the determination. The thus-created text (a text mixed with images) is displayed by a text displaying portion 12. Character patterns corresponding to the character codes are generated by a character pattern generating portion 13. The character codes in the text to be displayed are converted into character patterns by this character pattern generating portion 13, and the converted character patterns are displayed by the text display portion 12.

The instruction data or the characters used in the various types of processes are input by a keyboard 14. The image data (including the character patterns) from the text display portion 12 is displayed by a CRT 15. Movement of a graphic cursor displayed on the screen of the CRT 15 is controlled by a mouse 16, which is one of the pointing devices. Various types of text data and image data are stored in a hard disk unit 17. The image of an original document is read by a reader 18.

Figure 2:
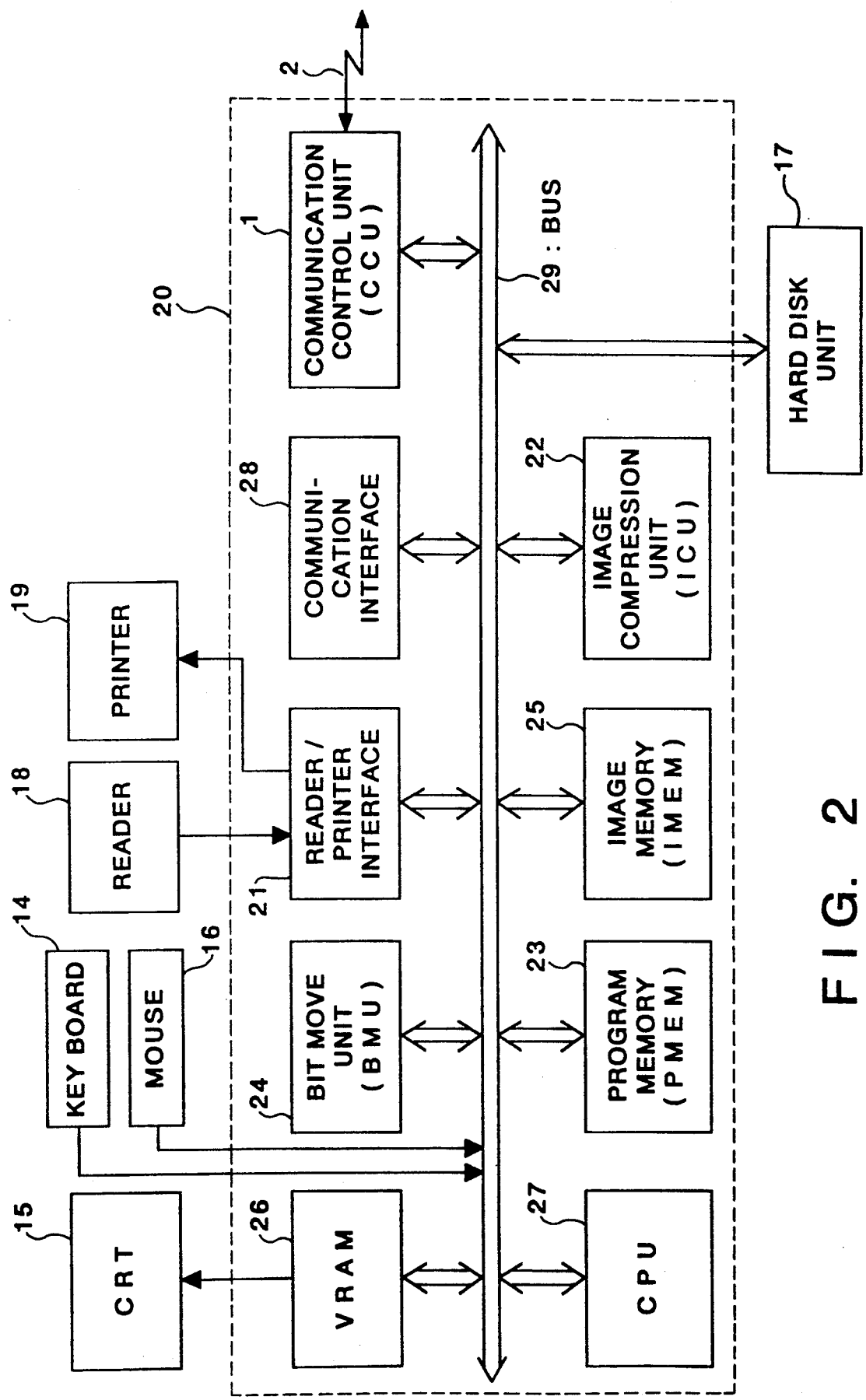
FIG. 2 is a schematic view of a text/image processing apparatus, illustrating the practical form of the preferred embodiment of the present invention.

FIG. 2 illustrates the practical form of this embodiment. The following description excludes that of the communication control unit 1, because it has been described previously, and because the employed communication control unit is a known one.

A body 20 of the text/image processing apparatus incorporates a reader/printer interface 21, an image compression unit (hereinafter referred to as an ICU) 22, a program memory (hereinafter referred to as a PMEM) 23, a bit move unit (hereinafter referred to as a BMU) 24, an image memory (hereinafter referred to as an IMEM) 25, a video RAM (hereinafter referred to as a VRAM) 26, a central processing unit (hereinafter referred to as a CPU) 27, a communication interface 28, and a communication control unit (hereinafter referred to as a CCU), which has been described previously.

The ICU 22 is capable of compressing or decompressing data. It adapts two-dimensional compression (high-compression) method to increase the coding efficiency. The PMEM 23 contains an area for an operating system required to control the I/O unit provided on the periphery of the body 20 as well as the units incorporated in the body 20, an application program area and a font memory area (corresponding to the character pattern generating portion 13 shown in FIG. 1) for storing the character patterns corresponding to character codes. The PMEM 23 and the CPU 27 in combination form the control portion 100. The PMEM 23 also incorporates a memory management unit (MMEU), and a work area which serves as a transmission buffer used when the data read from the hard disk unit 17 is to be transmitted through the CCU 1 and when the data received by the CCU 1 is to be stored in the hard disk unit 17. This work area is also used to store text data which is edited. So, the work area corresponds to the text memory 10. The above-described transmission buffer is used for the purpose of synchronizing the transfer rates of a disk, a communication line and so on.

Images are enlarged, reduced, rotated, moved, cut, or processed in another way by the BMU 24. Any of these processes is performed on the image stored in the VRAM 26, and this allows the contents of that editing to be displayed on the CRT 15. The IMEM 25 has a storage capacity of 4 M bytes. It stores the image read by the reader 18, the image edited by the BMU 24, the data decompressed by the ICU 22, text data corresponding to key code characters, mixed data or data representing the image converted from character codes. Mixed data is stored in the IMEM 25 in a state where an identification code is affixed to any of image blocks and character blocks. The IMEM 25 is also used to synchronize the rates of the reader 60 and the communication line 2.

The image data to be displayed on the CRT 15 is spread in the VRAM 26. In other words, an image can be displayed on the CRT by spreading that image in this VRAM 26.

The apparatus of this embodiment is of the type which is capable of communication of image data, character data and data with images and characters mixed with each other.

Since facsimile transmission and teletex transmission are performed in the conventional manners, communication of mixed data will be described below.

First, a text to be transmitted is divided into a plurality of blocks, including image areas and character areas. Next, codes representing the position and size of a block as well as other data on that block are affixed to each of the blocks. The resultant data blocks are partitioned into packets with each block constituting one packet, and are passed to a destination through a packet switching network.

Figure 6A:
FIG. 6A shows a format of data to be transmitted.

FIG. 6A shows the structure of data to be transmitted.

Portion "A" of the data to be transmitted contains transmission data, including the name of a sender, the date and time of transmission, a number of documents and so on. Portion "B" contains page data which is composed of identification data that indicates whether one page of an original document data to be transmitted are all character data, image data or data with image data and character data mixed with each other, and codes representing the number of data blocks that form one page. Portion "C" stores codes that represent whether the block is followed by another block. Portions "D" and "E" represent data blocks. The above-described transmission data "A", the page data "B", and the block data instruction codes "C" are affixed to the data to be transmitted by a transmitting apparatus.

Figure 6B:
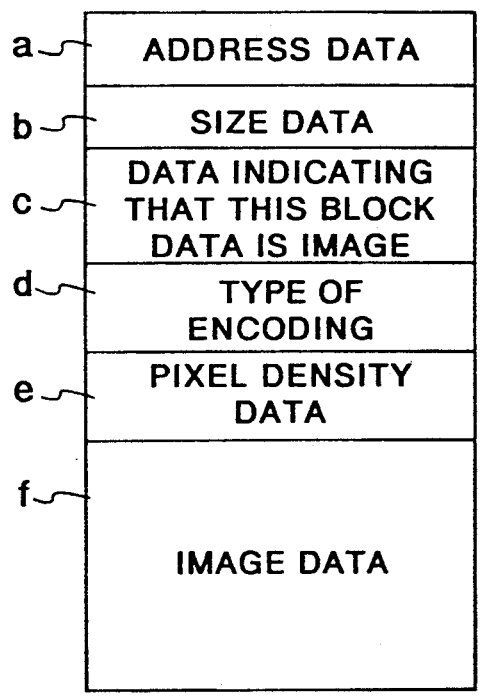
FIGS. 6B and 6C illustrate the contents of block data in the data to be transmitted shown in FIG. 6A.

FIG. 6B shows the structure of a data block which represents an image.

The data block which is an image is divided into areas from "a" to "f", as shown in FIG. 6B. Area "a" stores address data on a block. Area "b" stores size data on a block. Area "c" contains data indicating that data in this block is an image. Area "d" stores data which represents the type of a coding scheme employed to encode this image, e.g., it stores data representing the MH, MR or MMR coding scheme which is employed to encode the image data of this block. Another encoding schemes may also be used. Area "e" stores data representing the scanning density at which image data is scanned in the vertical scanning direction. Area "f" stores image data, which is in the form of encoded data.

Figure 6C:
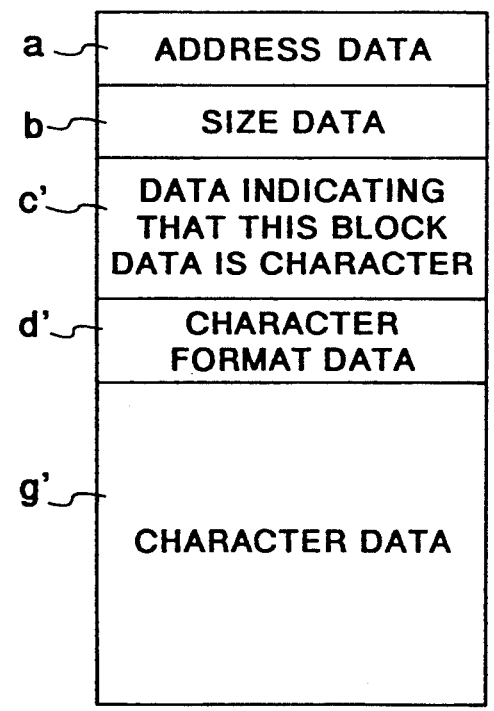

FIG. 6C shows the structure of a data block, which is character data.

Area "c'" stores data indicating that this data block is character data. Area "d'" stores data representing the format of character data, e.g., the character size and the direction in which characters are arranged. Area "g'" stores character data.

Next, how an operator creates documents to be transmitted will be described. Basically, the operator displays the image data input from the reader 18 and the character data input from the keyboard 14 on the CRT 15 and edits them to create documents.

More practically, the operator creates a text by means of the keyboard 14, and then divides one page of document data into a plurality of blocks while looking at the text displayed on the CRT 15, which corresponds to one page.

Subsequently, the operator inputs the address and the size of each block from the mouse 16 and the keyboard 14, and thereby adds the address data and the size data shown in FIGS. 6B and 6C to each block.

The image data read by the reader 18 is encoded by the ICU 22, the data indicating this coding scheme being stored in area "d" of FIG. 6B.

If the block data represents character data, the data representing the format of these characters is stored in area "d'".

The data representing the types of data are affixed to image data and character data at areas "c" and "c'", respectively.

Addition of the above-described various types of data is performed by the CPU 27. The thus-created one page of a document is stored in the hard disk unit 17. When this document is to be transmitted, the operator reads in the text from the hard-disk unit 17 by operating the keyboard 14, and then inputs the transmitter data A, the page data B and so on shown in FIG. 6A from the keyboard to add them to the text.

Subsequently, the thus-created data to be transmitted shown in FIG. 6A is transmitted on the communication line 2 through the CCU 1.

Next, reception of data will be described.

The data received through the communication line 2 and the CCU 1 is first stored in the hard-disk unit 17. At the same time, reception of the data is displayed on the CRT 15 so as to inform the operator of the same.

When the data received is to be displayed on the CRT or is to be printed out by the printer 19, the desired data is designated from the hard disk unit 17 by the operation of the keyboard 14. Upon receipt of this assignment, the CPU 27 reads such data from the hard disk unit 17 and performs the processes corresponding to the individual blocks in the data, e.g., generates dot data if the data represents character data, thereby to construct one page of an image representing the data received in the IMEM 25. If the data received contains image data blocks, decoding corresponding to the coding scheme for those data is performed by the ICU 22, and the resultant page image is spread in the IMEM 25. The page image written in the IMEM 25 can be displayed on the CRT 15 by transferring it to the VRAM. However, if the number of dots used to constitute the image data spread in the IMEM 25 exceeds the number of dots which can be used in displaying an image by means of the CRT 15, part of one page of image may be displayed on the CRT 15. Alternatively, the entirety of the image may be displayed by, for example, thinning out the image data stored in the IMEM 25. The image data spread in the IMEM 25 is printed out when it is output to the printer 19 through the reader/printer interface. The printer employed in this embodiment is a laser beam printer of the type which ensures a resolution sufficient to print the data spread in the IMEM 25.

The text format forming/processing portion 11, the character data editing portion 8, the text display portion 12, and the image data processing portion 9 shown in FIG. 1 respectively represent software processed by the CPU 27 in parallel by multitasking. These programs are stored in the ROM 101. The CPU 100 processes these programs in parallel by executing them on a time-sharing basis.

A problem arises when the data which is received in a divided into a plurality of blocks, as shown in FIG. 6A, has to be edited. For example, it is conceivable that documents are to be created by combining received text data with image data that is separately received.

In order to spread images at appropriate positions in the text, the characters must be rearranged in the individual blocks exclusive of the areas in which images are to be spread. However, this rearrangement of the character data must be performed for each block, whereupon some of the character data overflows from that block. The excess character data must then be moved to a subsequent block.

In this embodiment, when the image data received is to be combined with text that is received separately, the character data in all the character blocks in an objective text are joined to form one text file. In other words, a text comprised of n blocks is formed into one complete text. This makes it easier to rearrange the character data, which is required when an image is to be spread, because it eliminates the need to process the text which has been divided into a plurality of blocks separately for each block.

Image data received by a facsimile facility will be incorporated in a text received in the manner described below.

It is assumed here that the text data received divided into a plurality of blocks and data received by a facsimile facility have already been stored in the hard disk unit 17.

First, an operator selects the desired text data from the hard disk unit 17, and then reads it once in the text spreading area in the PMEM 23. A desired text may be selected from the hard disk unit 17 in any of various ways. However, in this embodiment, it is selected first by displaying a list of texts on the CRT 15 and then by selecting one text from the list by means of a mouse or the like. It may also be selected by inputting the name of a desired text by way of the keyboard 14.

Figure 3A:
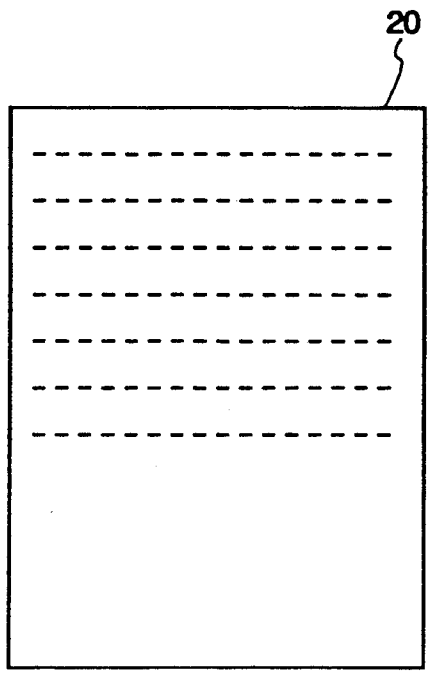
FIGS. 3A to 3C illustrate the setting of an image spreading area and a character rearranging processing.

After the text has been read in the PMEM 23, the CPU 27 joins the character data in the individual blocks of the text to form one text data. Next, the CPU 27 generates the character patterns that represent the text data sequentially, and spreads them in the VRAM 26 to display them on the CRT, as shown in FIG. 3A. In the illustration shown in FIG. 3A, the characters are shown as dots. However, it is to be noted that these dots respectively designate the characters.

Next, an operator sets an image area where image data is to be positioned by the operation of the mouse 16.

Figure 3B:
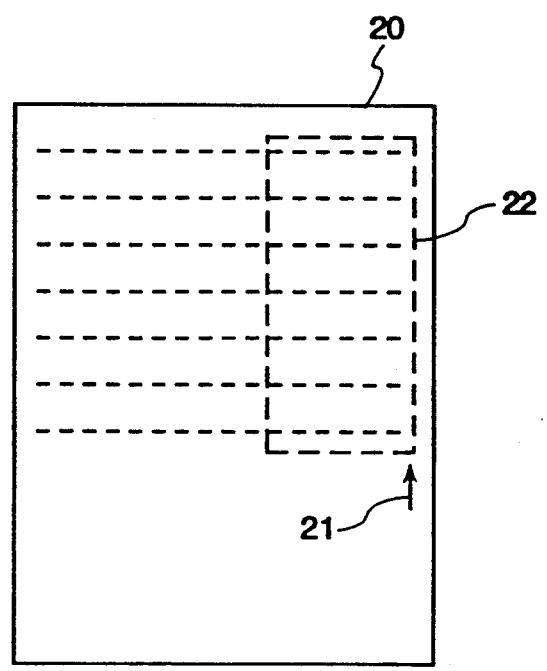

This image area is set by using a graphic cursor which moves in connection with the movement of the mouse 16. More specifically, the image area is set by designating any two points on the screen. A rectangular area with a diagonal extending between these two points forms the required image area. In FIG. 3B, reference numerals 21 and 22 respectively indicate a graphic cursor and an image area set by means of the graphic cursor. In this illustration, the first point designated by the graphic cursor represents the left upper point of the image spreading area. The second point is moved by moving the graphic cursor 21 and then by clicking a button provided on the mouse 16. During this movement of the graphic cursor which is performed so as to set the second point, a rectangle formed by the first point and this graphic cursor is displayed in real-time on the screen, which allows the operator to grasp the position and the size of the rectangular area being formed.

Figure 3C:
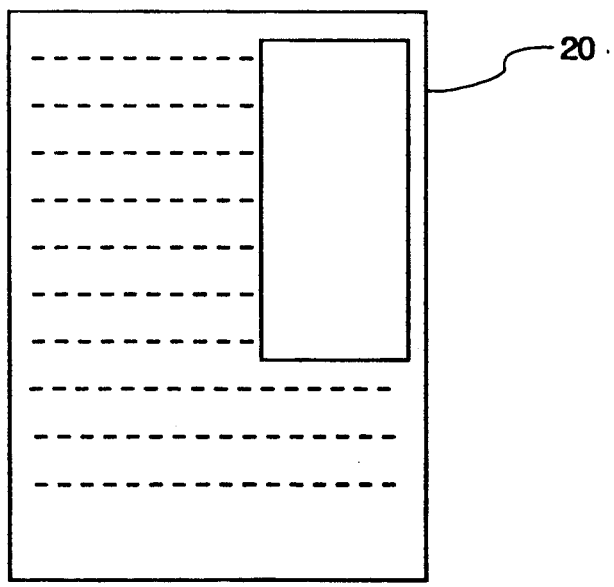

After the setting of the image spreading area 22, the characters are spread in an area outside this image area to obtain an image on the screen such as that shown in FIG. 3C.

Figure 4:
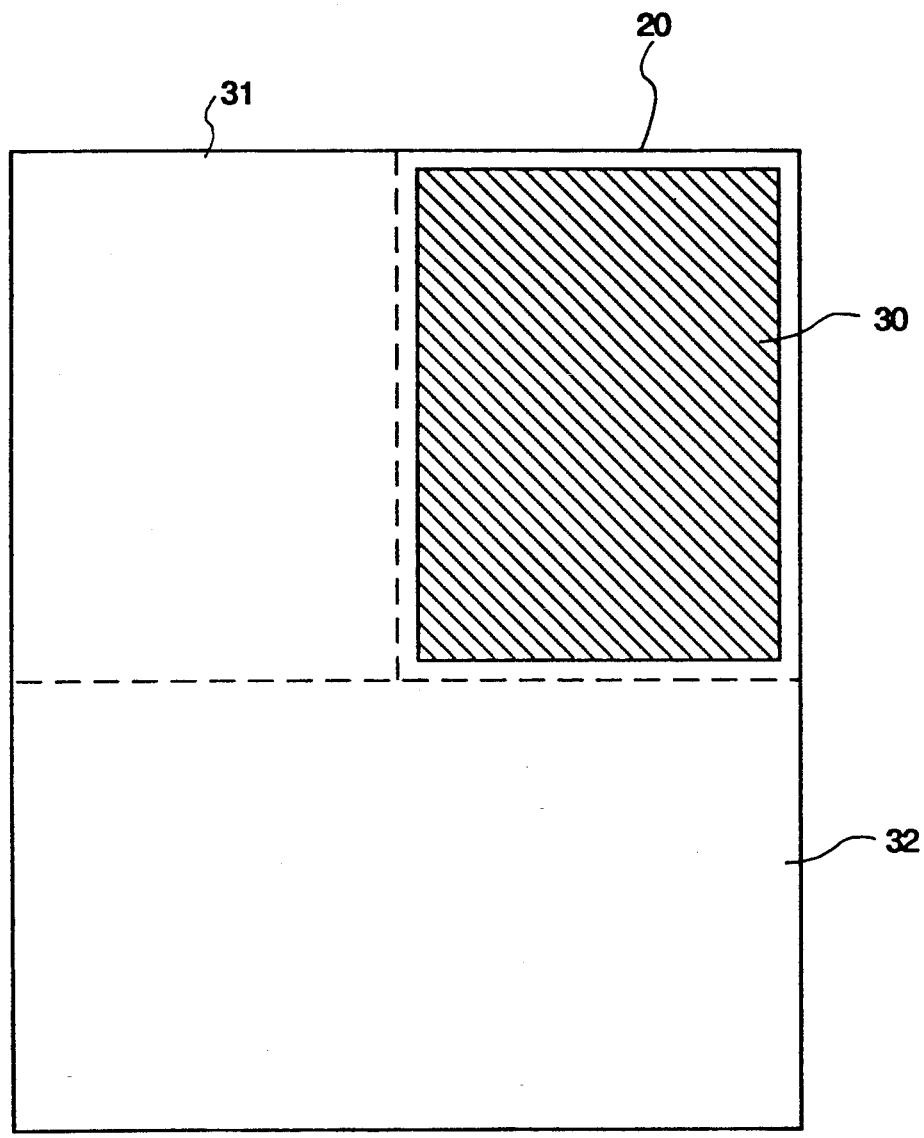
FIG. 4 illustrates an area division processing required for rearranging characters.

Once the image spreading area 22 has been defined, the data representing the position and the size of that rectangular area is stored at a predetermined address in the PMEM 23, and division of the page is then performed on the area exclusive of the rectangular area 22 on the screen. For example, if an image spreading area 30 represented by the hatched area shown in FIG. 4 is set, the other area is divided into rectangular areas 31 and 32 (hereinafter referred to as character spreading areas) where the characters are to be spread. At this time, division is performed in such a way as to ensure that the number of divided areas is kept to a minimum. In this way, the text flows naturally, and the resultant layout of the text ensures easy reading. Provision of character spreading areas is performed on the basis of the system disclosed in U.S. Ser. No. 911779, detailed description thereof being omitted here. However, the data representing the size and position of each of the character spreading areas is stored at a predetermined address in the PMEM 23.

After the division of the character spreading areas has been completed, one character spreading area is selected, and the number of characters that that area can store (the number of characters per one line as well as the number of lines in that area) is then calculated.

Subsequently, calculated number of characters are spread sequentially in that area. Once one character spreading area has been filled with characters, a subsequent character spreading area is selected to repeat the same process.

Thereafter, the operator selects one image stored in the hard disk unit 17 by the keyboard 17, and spreads it in the image spreading area which has already been set. Since the hard disk unit 17 stores encoded images, the image which is fetched from the hard disk unit 17 is decoded by the ICU 22. Further, if the size or the shape of the resultant image obtained by decoding the image stored in the hard disk unit 17 differ from those of the area where that image is to be spread, the image data may be thinned out or interpolated so that it can fit in the image spreading area. In this embodiment, if the dimension of the image data to be spread is a (height)×b(length), and if the size of an image spreading area is X (height) x Y (length), the size of the image data to be spread is reduced or enlarged at ratios of a/X and b/Y.

Figure 5A:
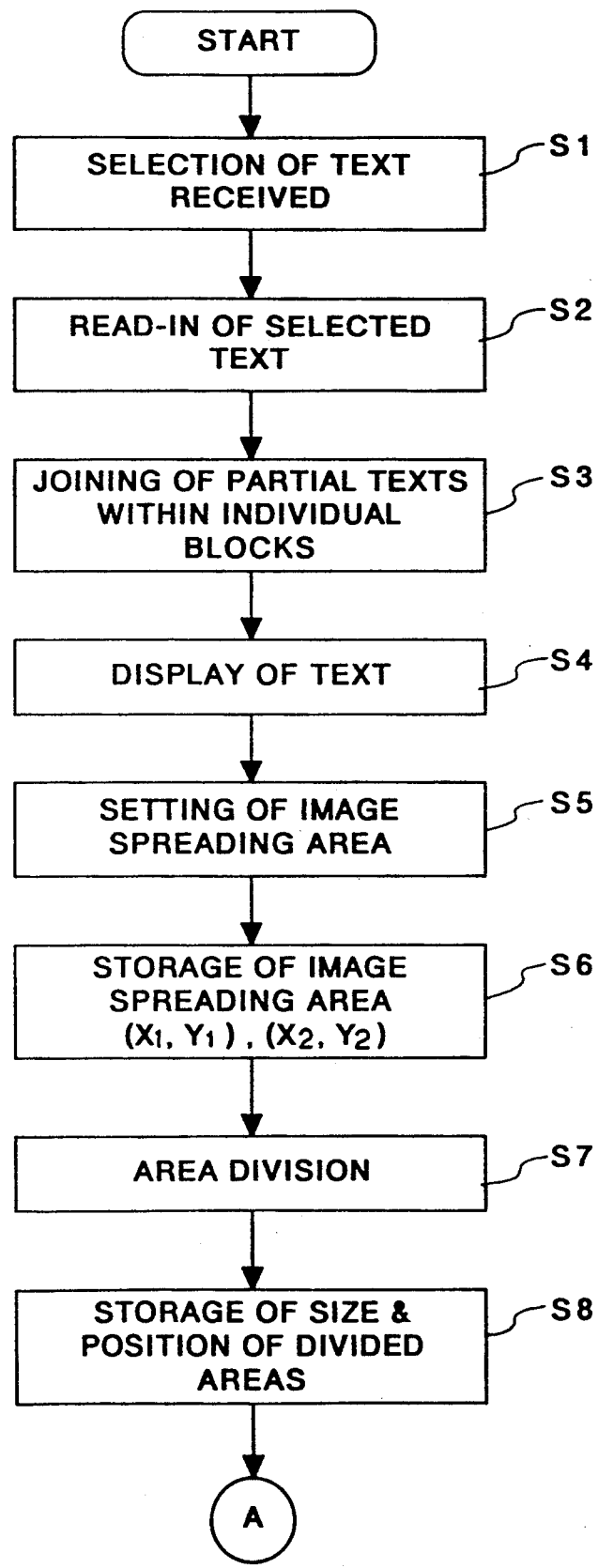
FIGS. 5A and 5B are flowcharts which explain the operation of a central processing unit in the preferred embodiment of the present invention.
Figure 5B:
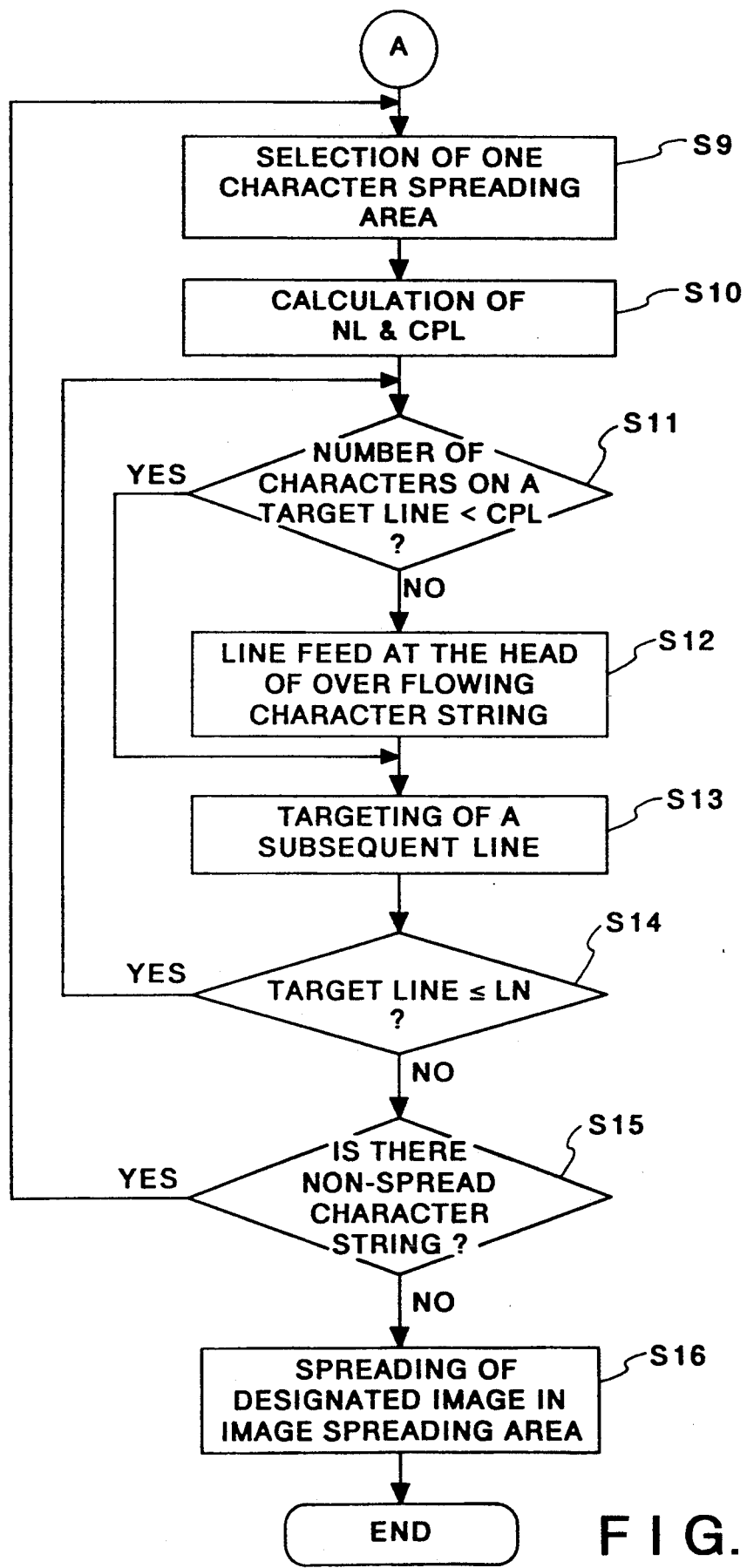

FIGS. 5A and 5B are flowcharts of the above-described operations.

First, one text to be edited is selected from a plurality of texts received and stored in the hard disk unit 17 in step S1, and the selected text is then read in the PMEM 23 in step S2. Subsequently, in step S3, the text which is composed of a plurality of blocks is converted into one complete text. The resultant text is displayed on the CRT 15 in step S4.

Figure 7:
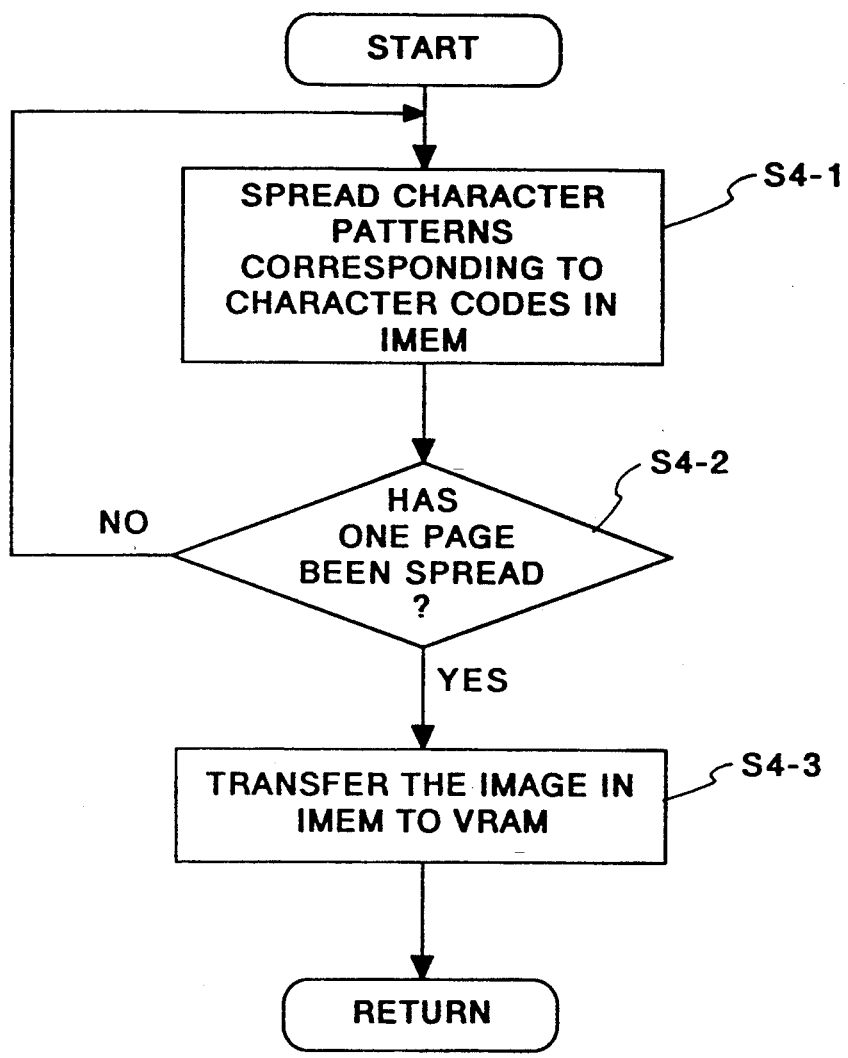
FIG. 7 is a flowchart of a text display processing.

The complete text is displayed in step S4 in the processing shown in FIG. 7.

First, in step S4-1, the character patterns corresponding to the character codes for one page of a text to be displayed which is obtained by joining the blocks are spread in the IMEM 25. This process is repeated until it is determined in step S4-2 that it has been performed on the whole page. Once the character patterns corresponding to one page have been generated in the IMEM 25, the resultant data is transferred to the VRAM 26, and is then displayed on the CRT 15 in step S4-3.

Figure 8:
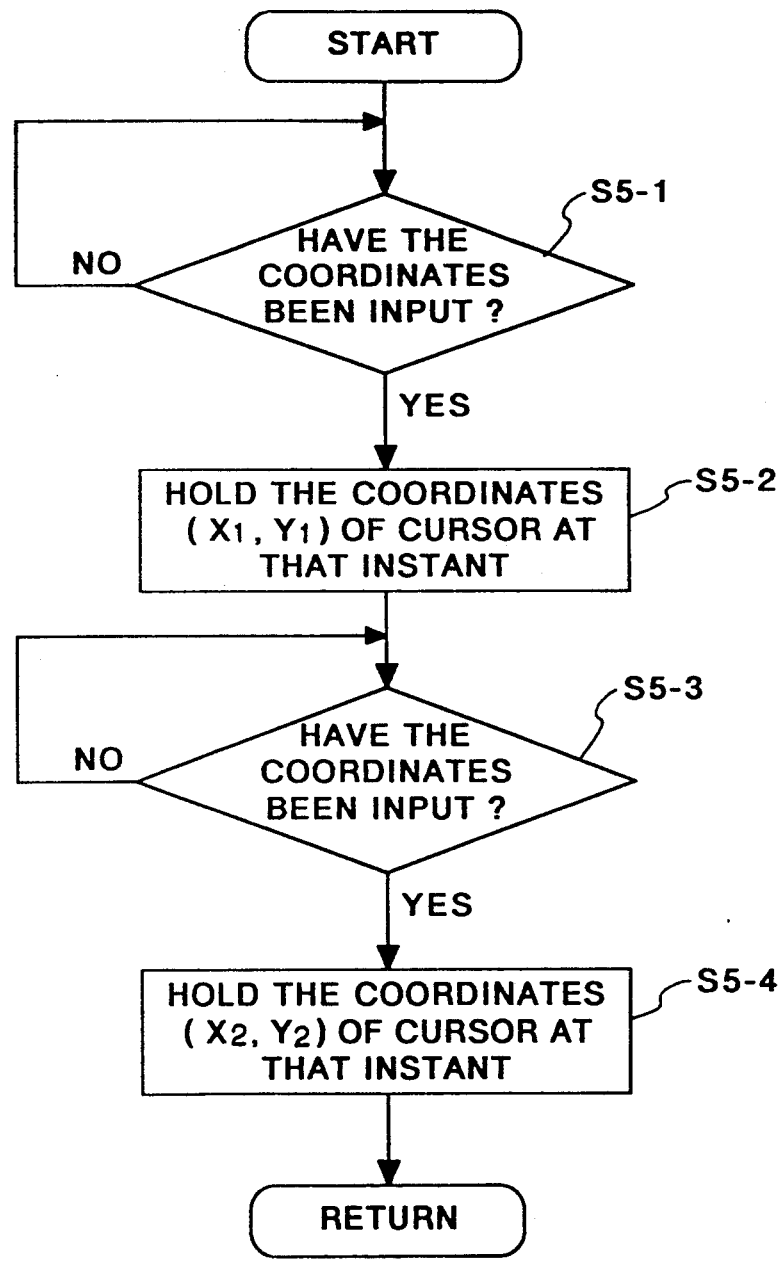
FIG. 8 is a flowchart of an image spreading area setting processing.

Once the text corresponding to one page has been displayed on the CRT 15, the process proceeds to step S5 (shown in FIG. 5A) where an image spreading area is set. The image spreading area is set in the manner shown in FIG. 8.

First, it is determined in step S5-1 whether or not the coordinates of the first point have been input, i.e., whether or not pressing of the button of the mouse 16 has been detected. If the answer is yes, the process goes to step S5-2 where the coordinates $(X_1, Y_1)$ at which the cursor was located at that instant are held. Subsequently, it is determined in step S5-3 whether or not the coordinates $(X_2, Y_2)$ of the second point have been input. Once the coordinates have been input, the coordinates $(X_2, Y_2)$ at which the second point was located at that instant are retained, and the process then returns to the main routine shown in FIG. 5.

Once the image area has been set, the process goes to step S6 where the position and size of the image area, i.e., the retained coordinates $(X_1, Y_1)(X_2, Y_2)$, are stored at a predetermined address of the PMEM 23.

Figure 9:
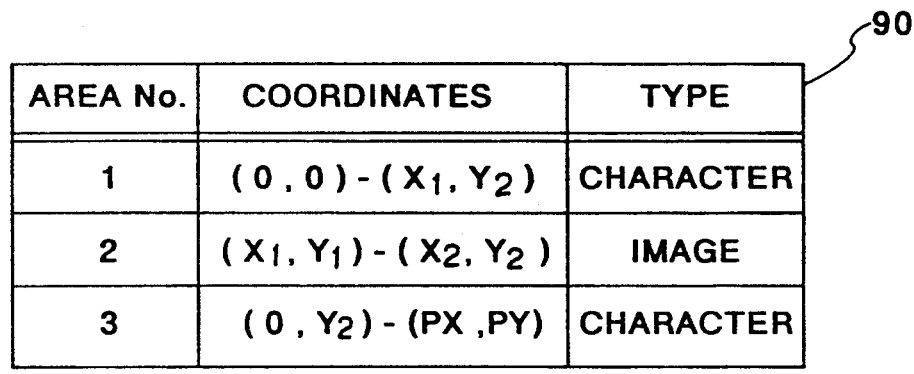
FIG. 9 is a table indicating the relationship between the type of area created in the preferred embodiment of the present invention and the position thereof.

Thereafter, in step S7, division of the area other than the image area is performed to define individual character areas and to obtain the position and size of each of the character areas. The position and size of each of the character areas are given by the coordinates of the two points, as in the case of the aforementioned image area. The obtained position and size of each of the character areas are stored in the PMEM 23 in step S8. This means that data representing the positions and the sizes of the image area and the character areas have been all formed. Thereafter, the obtained data are rearranged to create a table 90 shown in FIG. 9 in the PMEM 23, the table 90 listing image areas and character areas. The items of the table 90 shown in FIG. 9 include area No., the coordinates of an area, and data indicating whether an area is an image area or character area. In the case shown in Table 90, an origin (0, 0) is set at the left upper end of the CRT 15, and the coordinates of the right lower end are set as (PX, PY).

In this embodiment, areas are listed in the table 90 in the order in which an area having a smaller X coordinate is given priority over that having a larger X coordinate, if the left upper ends of areas have the same Y coordinate. As a result, in a case where an image area 30 is set, as shown in FIG. 4, Table 90 lists areas in the order shown in FIG. 9. Other standards may also be employed to arrange the areas.

Once the processing of step S8 has been executed, the process goes to step S9.

In step S9, one character area is selected by referring to the created table. In this embodiment, the character area having the smallest area number is selected first, the area having the second smallest area number being selected subsequently and so on. If the area to be selected is an image area, a subsequent area is selected.

Once one character area has been selected, the number of characters per line (hereinafter referred to as a CPL) in that area and the total number of lines (hereinafter referred to as an NL) is calculated in step S10. The CPL is obtained by dividing the length of the selected character area in the direction of X axis by the width of one character pattern. The NL is calculated by dividing the height of the character area in the direction of Y axis by the height of one character pattern. The digits to the right of the decimal of the obtained values are omitted.

During the execution of the processing of step S10, the CRT 10 displays on the screen an image shown in FIG. 3B in which part of the text overlaps an image area.

Thereafter, it is determined in step S11 whether or not the number of characters on a target line (starting with the line located at the top) exceeds the CPL of the selected character area. If the answer is yes, the process goes to step S12 where line feed is performed immediately after the last character that can be entered in selected area. The overflowing string of characters is moved to the head of a subsequent line, and this allows the target line to be located within the selected character area. If the number of characters located on the target line is not more than the CPL (which means that there exists a carriage return code in this line and so on), the process proceeds to step S13.

In step S13, the target line moves to a subsequent line. Thereafter, it is determined in step S14 whether or not the target line updated has reached the NL, of the selected character area.

If the target line does not reach the NL, the execution of the processings of step S11 and the subsequent steps is repeated until the answer becomes no in step S14.

The negative answer of step S14 means that spreading of characters in the selected character area has been completed. Thus, the processing proceeds to step S15 where it is determined whether or not there exists non-spread characters.

If the answer is yes, a subsequent character area is selected in step S9, and the same processes as those executed for the first character area are executed.

Once all the characters have been spread, the process goes to step S16. In this processing, the operator selects any one image data from a set of image data stored in the hard disk unit 17, and reads in the selected image data to spread it in the previously set image area. At that time, if the size or shape of this image does not coincide with that of the image area, thinning out or interpolation will be performed on the image data.

The thus-created data with text and images mixed with each other may be printed out by the printer 19 or stored in the hard disk unit 17. When the data is to be transmitted in the mixed mode, it may be transmitted in the form of data to be transmitted shown in FIG. 6A, which is created readily from the table created.

As will be understood from the foregoing description, in the present invention, it is possible to spread images received at appropriate positions of a text which is separately received by a simple operation.

Further, flexible editing is possible because of automatic conversion of the text received into one complete text. Furthermore, the contents of edition become simple to the CPU 27, making a high-speed processing possible.

As many apparently widely different embodiments of the present invention can be made without departing from the spirit and scope thereof, it is to be understood that the invention is not limited to the specific embodiments thereof except as defined in the appended claims.

What is claimed is:

1. A data processing apparatus for editing mixed data including at least two rectangular text data blocks and at least one rectangular image data block, each of the text data blocks including character code data, the at least one image data block including image data, and each of the data blocks further including at least block information for determining layout and kind-of-data-block thereof, said apparatus comprising:

memory means for storing a plurality of mixed data which are received through a communication line;
designation means for designating mixed data stored in said memory means;
converting means for converting at least two text data blocks in the mixed data designated by said designation means into one text data block; and
editing means for editing the mixed data including the one text data block produced by said converting means.

2. A data processing apparatus according to claim 1, wherein said converting means converts all text data blocks in received mixed data into one text data block.

3. A data processing apparatus according to claim 2, further comprising:

memory means for storing management information to manage layout of each text data block and image data block in a page; and
display means for display the mixed data based upon the management information.

4. A data processing apparatus according to claim 3, further comprising changing means for changing the management information, wherein said editing means edits the mixed data based upon the management information changed by said changing means.

5. A data processing apparatus according to claim 4, wherein said changing means changes size or position of area of the image data block.

6. A data processing apparatus according to claim 3, wherein the management information includes information of size and position of area of the text data blocks and image data block.

7. A data processing apparatus according to claim 3, wherein said displaying means has a display area within which to display information, and wherein said editing means is structured and arranged to enlarge or reduce the information being displayed as necessary to fit within the display area.

8. A data processing apparatus according to claim 1, further comprising memory means for storing mixed data converted by said converting means.

9. A data processing apparatus according to claim 1, further comprising display means for displaying text in the text data block produced by said converting means, and wherein said editing means further comprises:

changing means for changing layout of the image data block in the mixed data;
arranging means for arranging the text displayed by said display means; and
dividing means for dividing the text arranged by said arranging means into a plurality of text data blocks based upon the layout of the image data block changed by said changing means.

10. A data processing apparatus according to claim 1, wherein the mixed data includes:

transmission data including the name of a sender, the data and time of transmission and a number of documents;
identification data for determining whether a page of an original document data to be transmitted is all character data, all image data, or data with image data and character data mixed with each other, and for representing the number of data blocks that form one page;
data representing whether the block is followed by another block; and
a data block consisting of character code data or image data.

11. A data processing apparatus according to claim 10, wherein each of the data blocks includes;

data indicating size of the data block;
data representing a kind of that data block;

data representing a type of a coding scheme employed, if that data block includes image data;

data representing the format of character codes, if that block includes character codes; and data comprising character code data or image data, respectively;

12. A data processing apparatus according to claim 1, wherein both the text data and the image data block include:

data indicating size of that data block;

data representing a kind of that data block;

data representing a type of coding scheme employed, if that data block includes image data;

data representing the format of character codes, if that block includes character codes; and data comprising character code data or image data, respectively.

13. A data receiving apparatus for receiving mixed data which has been divided into at least two rectangular text data blocks and at least one rectangular image data block, each text data block including character code data, the at least one image block including image data, and each of the data blocks further including at least block information for determining layout and kind-of-data-block thereof, said apparatus comprising:

memory means for storing a plurality of mixed data which are received through a communication line;

designation means for designating mixed data stored in said memory means;

converting means for linking character code data in plural text data blocks included in the mixed data designated by said designation means;

display means for displaying the text data produced by said converting means and the associated image data block; and editing means for editing the text data displayed by said display means.

14. A data receiving apparatus according to claim 13, wherein the mixed data is date of one page.

15. A data receiving apparatus according to claim 14, further comprising memory means for storing management information to manage layout of the text data blocks and the image data block on the page.

16. A data receiving apparatus according to claim 15, further comprising changing means for changing the management information stored in said memory means, wherein said editing means edits the mixed data based upon the management information changed by said changing means.

17. A data processing apparatus according to claim 13, wherein the mixed data includes:

transmission data including the name of a sender, the data and time of transmission and a number of documents;

identification data for determining whether a page of an original document data to be transmitted is all character data, image data, or data with image date and character data mixed with each other, and for representing the number of data blocks that form one page;

data representing whether the blocks is followed by another block; and a data block consisting of character code data or image data.

18. A data processing apparatus according to claim 17, wherein each data block includes:

data indicating size of that data block;

data representing a kind of that data block;

data representing a type of a coding scheme employed, if that data block includes image data;

data representing the format of character codes, if that block includes character codes; and data comprising character code data or image data, respectively.

19. A data processing apparatus according to claim 13, wherein both of the text data block and the image data block include:

data indicating size of that data block;

data representing a kind of that data block;

data representing a type of a coding scheme employed, if that data block includes image data;

data representing the format of character codes, if that block includes character codes; and data comprising character code data or image data, respectively.

20. A data processing apparatus according to claim 13, wherein said displaying means has a display area within which to display information, and wherein said editing means is structured and arranged to enlarge or reduce the information being displayed as necessary to fit within the display area.

21. A method for receiving a page of mixed data which has been divided into at least two rectangular text data blocks and at least one rectangular image data block, and for processing the mixed data, each text block including character code data, the at least one image data block including image data, and each of the data blocks further including at least block information for determining layout and kind-of-data-block thereof, comprising the steps of:

storing a plurality of mixed data in a predetermined storage device, the mixed data having been received through a communication line;

designating a body of mixed data from among the mixed data stored in said storing step;

creating one text data block of character code data from plural text data blocks included in the mixed data designated in said designating step;

displaying the one text data block produced in said creating step; and editing the test data block displayed in said displaying step.

22. A method according to claim 21, further comprising the step of changing the management information, wherein mixed data is edited based on the changed management information.

23. A method according to claim 21, wherein mixed data includes:

transmission data including the name of a sender, the data and time of transmission and a number of documents;

identification data for determining whether a page of an original document data to be transmitted is all character data, image data or data with image data and character data mixed with each other, and the representing the number of data blocks that form one page;

data representing whether the block is followed by another block; and a data block consisting of character code data or image data.

24. A method according to claim 23, wherein each data block includes:

data indicating size of that data block;

data representing a kind of that data block;

data representing a type of a coding scheme employed, if that data block includes image data;

data representing the format of character codes, if that block includes character codes; and data comprising character code data or image data, respectively.

25. A method according to claim 21, wherein both the text data block and the image data block include:

data indicating size of that data block;

data representing a kind of that data block;

data representing a type of a coding scheme employed, if that data block includes image data;

data representing the format of character codes, if that block includes character codes; and data comprising character code data or image data, respectively.

26. A method according to claim 21, wherein said displaying step further comprises displaying the one text data block and any associated image data block within a display area, and wherein said editing step further comprises enlarging or reducing the one text data block and associated image data block as necessary to fit that data within the display area.

* * * * *

UNITED STATES PATENT AND TRADEMARK OFFICE
CERTIFICATE OF CORRECTION

PATENT NO. : 5,204,946
DATED : April 20, 1993
INVENTOR(S) : YASUHITO SHIMAMURA

It is certified that error appears in the above-identified patent and that said Letters Patent is hereby corrected as shown below:

ON THE TITLE PAGE:
IN [56] REFERENCES CITED

Under U.S. PATENT DOCUMENTS, insert:

```
--4,819,063  4/1989  Sugiura et al. ....... 358/75
  4,827,349  5/1989  Ogata et al. ......... 358/256
  4,829,385  5/1989  Takezawa ............. 358/260
  4,910,785  3/1990  Nakatsuma ............ 382/9
  4,922,349  5/1990  Abe et al. ........... 358/443--.
```

COLUMN 1

Line 63, "ings" should read --ings,--.

COLUMN 2

Line 47, "editions," should read --editings,--.

COLUMN 4

Line 43, "Another" should read --Other--.

COLUMN 5

Line 15, "transmitter data A," should read
--transmission data A,--.
Line 38, "spread" should read --written--.
Line 61, "in" should be deleted.
Line 62, "a divided" should read --divided--.

UNITED STATES PATENT AND TRADEMARK OFFICE
CERTIFICATE OF CORRECTION

PATENT NO. : 5,204,946
DATED : April 20, 1993
INVENTOR(S) : YASUHITO SHIMAMURA

It is certified that error appears in the above-identified patent and that said Letters Patent is hereby corrected as shown below:

COLUMN 6

Line 59, "real-time" should read --real time--.

COLUMN 7

Line 29, "keyboard 17," should read --keyboard 14,--.

COLUMN 8

Line 30, "No.," should read --number,--.
Line 63, "CRT 10" should read --CRT 15--.

COLUMN 9

Line 47, "edition" should read --editing--.

COLUMN 10

Line 15, "for display" should read --for displaying--.
Line 66, "includes;" should read --includes:--.
Line 67, "the" should read --that--.

COLUMN 11

Line 6, "respectively;" should read --respectively.--.
Line 8, "text data" should read --text data block--.
Line 12, "coding" should read --a coding--.
Line 39, "date" should read --data--.
Line 57, "date" should read --data--.
Line 61, "blocks" should read --block--.

UNITED STATES PATENT AND TRADEMARK OFFICE
CERTIFICATE OF CORRECTION

PATENT NO. : 5,204,946
DATED : April 20, 1993
INVENTOR(S) : YASUHITO SHIMAMURA

It is certified that error appears in the above-identified patent and that said Letters Patent is hereby corrected as shown below:

COLUMN 12

Line 43, "test" should read --text--.
Line 49, "mixed" should read --the mixed--.
Line 58, "the" should read --for--.

COLUMN 13

Line 11, "a coding" should read --the coding--.

Signed and Sealed this

Twenty-ninth Day of March, 1994

BRUCE LEHMAN

Attest:

Attesting Officer    Commissioner of Patents and Trademarks